(No Model.) 3 Sheets—Sheet 2.
C. D. WHITE.
AGRICULTURAL MACHINE.
No. 455,676. Patented July 7, 1891.
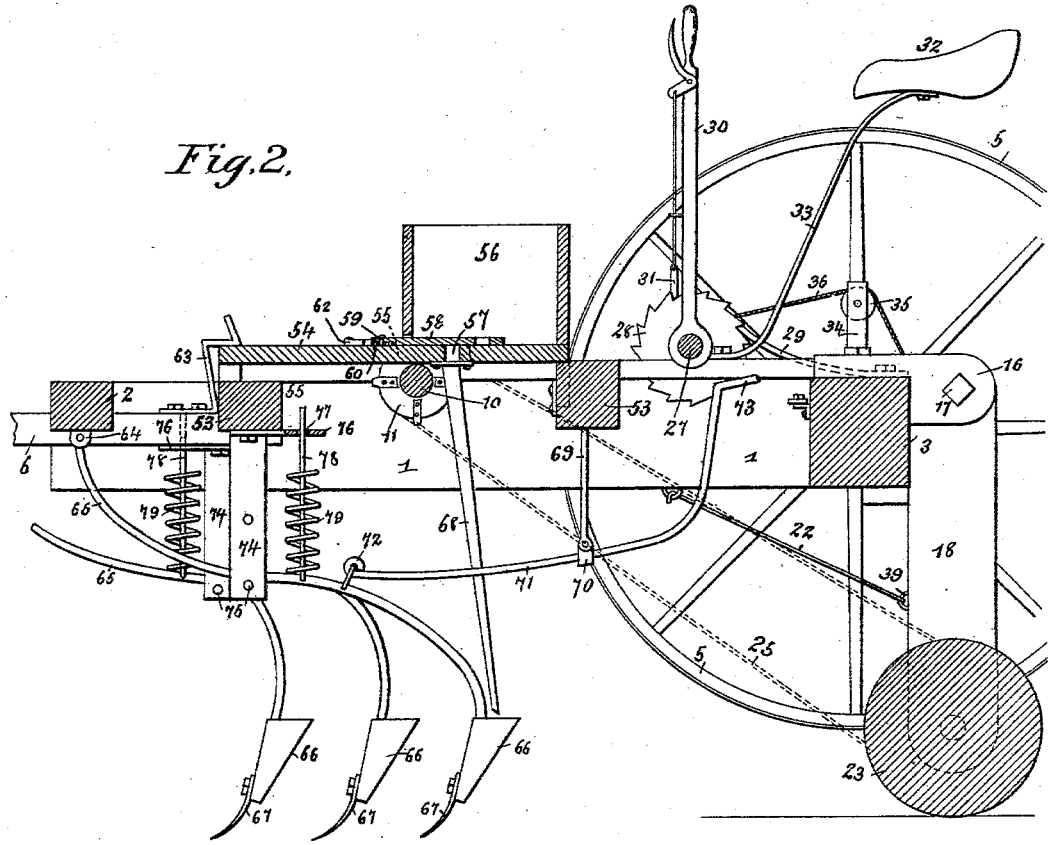
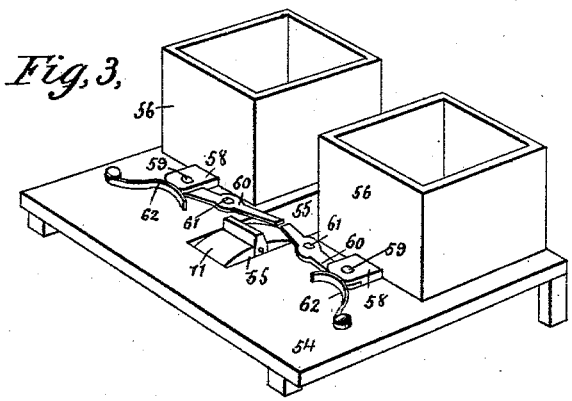
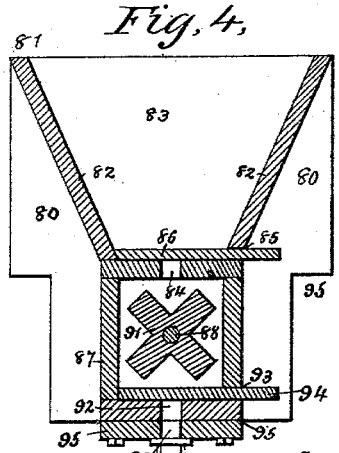
Witnesses:
Jas. K. McCathran
W. S. Duvall
By his Attorneys,
C. A. Snow & Co.
Inventor
Cullen D. White (No Model.) 3 Sheets—Sheet 3.
C. D. WHITE.
AGRICULTURAL MACHINE.
No. 455,676. Patented July 7, 1891.
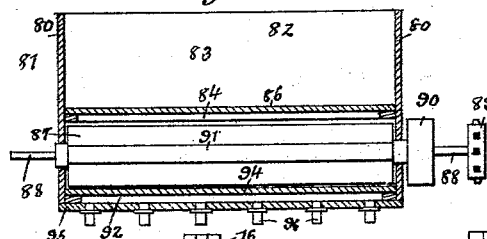
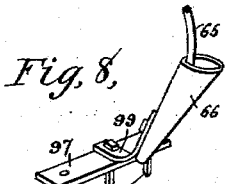
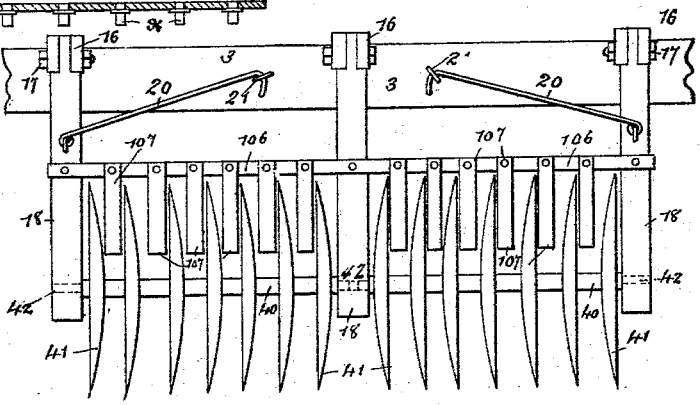
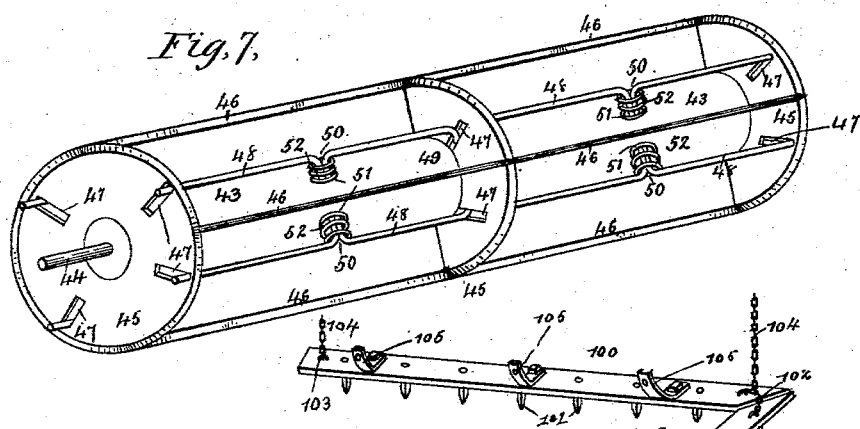
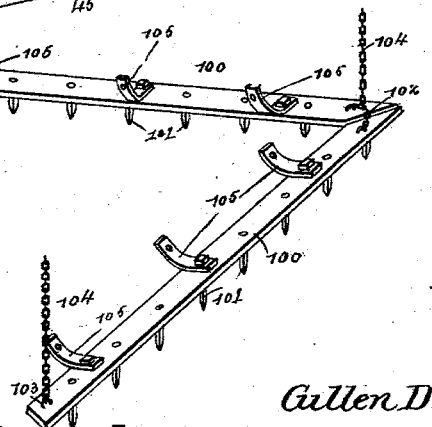
Witnesses:
Jas. K. McCathran
W. S. Duvall
Inventor
Cullen D. White
By his Attorneys,
C. A. Snow & Co.
THE NORRIS PETERS CO., PHOTO-LITHO., WASHINGTON, D. C.

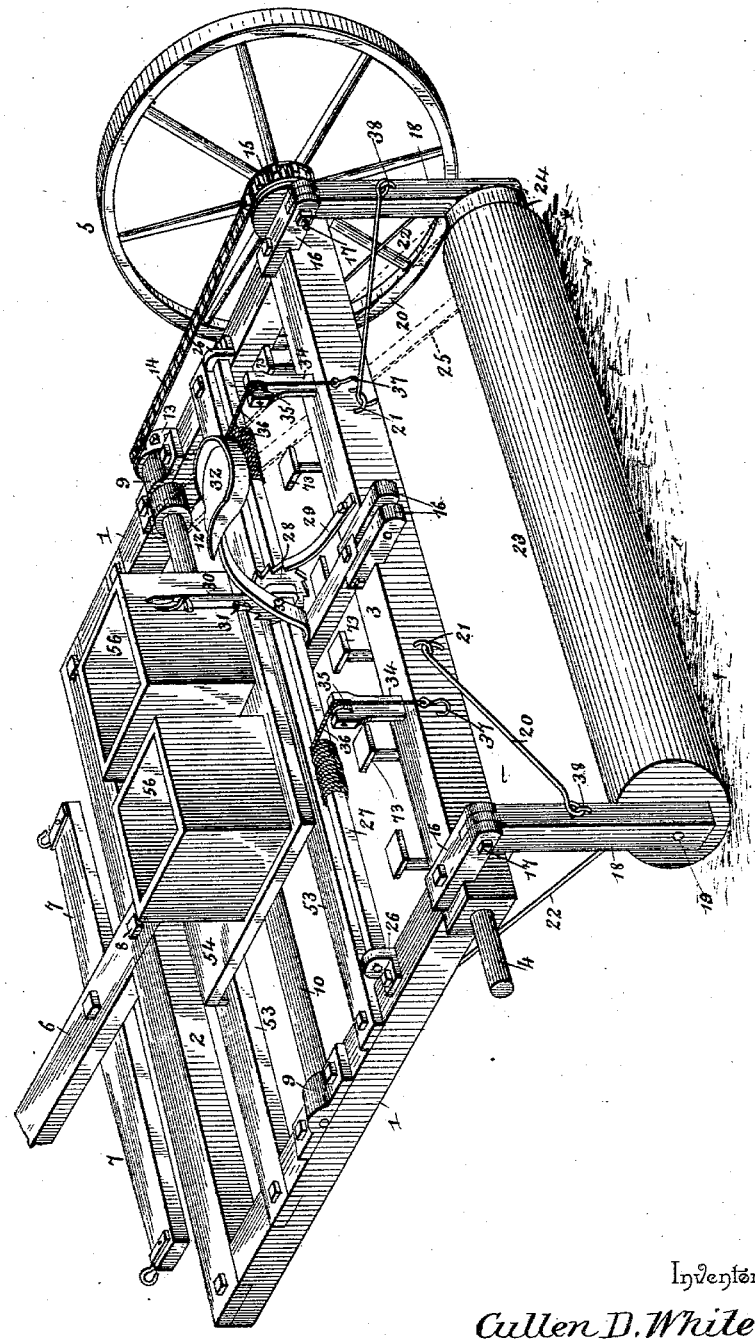

UNITED STATES PATENT OFFICE.

CULLEN D. WHITE, OF DRESDEN, TENNESSEE, ASSIGNOR OF ONE-HALF TO BELL W. ETHERIDGE, OF SAME PLACE.

AGRICULTURAL MACHINE.

SPECIFICATION forming part of Letters Patent No. 455,676, dated July 7, 1891.

Application filed September 15, 1890. Serial No. 365,047. (No model.)

*To all whom it may concern:*

Be it known that I, CULLEN D. WHITE, a citizen of the United States, residing at Dresden, in the county of Weakley and State of Tennessee, have invented a new and useful Agricultural Machine, of which the following is a specification.

This invention has relation to combination agricultural machines.

The objects of the invention are to provide a machine of the above class so constructed as to include in its make-up all the necessary implements for preparing the ground for the reception of and planting the seed in various ways and cultivating the plants, the various parts being detachable and adapted for substitution one for the other, and the entire machine being under the control of the operator while seated thereupon and of a comparatively simple and economical construction.

Various other objects of the invention will hereinafter appear, and the novel features thereof will be particularly pointed out in the claims.

Referring to the drawings, Figure 1 is a perspective of an agricultural machine constructed in accordance with my invention, said machine being adapted for drilling seed and subsequently rolling the same. Fig. 2 is a vertical longitudinal section of Fig. 1. Fig. 3 is a detail in perspective of the intermittent seed-planting hopper. Fig. 4 is a transverse section of the broadcast or drill planting hopper to be used in planting small seed, such as timothy, &c. Fig. 5 is a longitudinal section of the last-mentioned hopper. Fig. 6 is a rear end elevation of a portion of the machine, the same being provided with a disk cultivator or plow in lieu of the roller shown in Fig. 1. Fig. 7 is a detail in perspective of a cornstalk-cutter attachment, the same being designed for substitution in place of the disk-cultivator. Fig. 8 is a detail in perspective of the lower end of one of the seed-drills, the same being supplied with a harrow attachment. Fig. 9 is a detail in perspective of a harrow attachment, the same being designed for connection with the ends of the several seed-drill standards and to be used in lieu of the small harrow-sections illustrated in Fig. 8, which latter are merely employed for harrowing between rows.

Like numerals indicate like parts in all the figures of the drawings.

In practicing my invention I employ a rectangular frame comprising opposite side bars 1, front bar 2, and a rear bar 3, which latter extends beyond the side bars, is reduced to form axles or bearings 4, and carries opposite ground-wheels 5.

6 designates the draft-bar or tongue having the usual doubletree 7, the rear end of the tongue being securely bolted, as at 8, to the center of the front bar 2.

Upon the upper side of the side bars 1 in removable boxes 9 is journaled a rotatable shaft 10, provided at its center with a cam knocking-wheel 11. The shaft 10 is provided near one of its bearings with a pulley 12 and beyond its bearing with a small sprocket-wheel 13. The sprocket 13 is rotated by means of an endless sprocket-chain 14, which passes over a larger sprocket 15, formed upon the hub of the adjacent ground-wheel 5.

Secured upon the upper side of the axle 3 and projecting rearwardly from the same are three hangers 16, the outer ends of which are bifurcated and have passed therethrough bolts 17. These hangers are disposed one at each end of the bar or axle 3 and one at the center thereof. In the bifurcations of the hangers and adapted to be loosely connected therein by the bolts 17 is a series of three suspension-bars 18, provided at their lower ends with bearing-openings 19. (See Fig. 1.) Loosely connected hooked rods 20 are secured to the two outer or end suspension-bars 18 and are adapted by reason of their outer hooked ends for removable engagement with a pair of staples or eyes 21.

22 designates inclined brace-rods similar to the rods 20, which are loosely connected with the front sides of the bars 18 and with the under sides of the bars 1 in advance of the former bars. By this means the suspension-bars 18 are rigidly held in a vertical position, as will be apparent.

23 designates a roller, the axle of which is removably journaled in the bearing-openings 19 of the bars 18. This roller is reduced at one end to form a pulley 24, around which may be passed a belt 25, which belt also passes over the small pulley 12 of the knocker-shaft 10. The belt 25 may be substituted for the chain 14 and sprockets 13 and 15 for the purpose of running the knocker-shaft, the function of which will hereinafter appear.

In bearings 26, located upon the side bars 1 near the rear end of the machine, is journaled a windlass-shaft 27, provided near its center with a ratchet 28, engaged and prevented from turning by a spring-pawl 29. A hand-lever 30 is mounted on the windlass-shaft 27 and is provided with a spring locking-bolt 31. A slight distance in rear of the ratchet and within easy reaching distance of the lever is the driver's seat 32, supported upon the usual spring-standard 33. Upon the axle or rear bar 3, at each side of the driver's seat, are located short vertical standards 34, the upper ends of which are bifurcated and have journaled therein grooved pulleys 35. Ropes or chains 36 are made fast to the windlass-shaft and have their rear ends passed over the pulleys 35 and terminating in rear thereof in hooks 37, which hooks are adapted for engagement with staples 38, which serve as a means for loosely connecting the brace-rods 20 to the hanger-bars 18. It will be apparent that by disengaging the braces 20 and 22 the roller 23 may be drawn after the machine and only its own weight employed for rolling the ground. If, however, it is desired to throw more weight upon said roller, the ropes or chains 36 and their hooks 37 are removed from the pulleys 35, passed under the axle 3, and connected to the staples 39, which serve as a means of connection between the inclined braces 22 and the bars 18. Now by revolving the windlass-shaft by means of the lever 30 the ropes or chains will be wound thereupon and gradually draw the hanging bars 18 from a substantially horizontal or inclined position to a vertical position. The brace-rods 20 and 22 are then connected with the frame, as indicated in Figs. 1 and 2, and it will be apparent that the ground-wheels 5 will be elevated from the ground and the entire weight of the apparatus and driver be thrown upon the roller 23. By such an arrangement the roller is adapted for operation upon various kinds of soil and grounds in various conditions, it being well known that some soils require exceedingly heavy rolling to properly crush the same, while other soils require but a light rolling, and a heavy rolling would only tend to too close packing of the soil. By a reversal of the operation described the machine may be lowered, so that the ground-wheels 5 will rest upon the ground and support the machine, and the roller 23 will be swung to the rear. By disconnecting the ropes or chains, passing them over the grooved pulleys 35, and connecting the hooks 37 thereof to the staples 38 and winding upon the shaft 27 the roller may be swung up from off the ground and the braces 20 connected, as will be apparent, and thus the machine adapted to be transported to or from the field, as will be apparent.

Referring more particularly to Fig. 6 of the drawings, 40 designates a pair of shafts or axles, upon which at intervals are secured disk plows or cultivators 41, of ordinary construction. Each end of each of the axles 40 is reduced to form a bearing 42. In employing this cultivator or plow I employ the central suspension-bar 18, the outer bearings 42 of the axles 40 taking in the bearing-openings at the lower ends of the side suspension-bars 18, and the inner reduced bearing ends of said axles occupying one-half of the bearing-opening formed in the lower end of the central suspension-bar 18. These disk-plows operate in the same manner as an ordinary disk plow or harrow, and, as will be apparent, may be swung under to the rear of and over the frame in the same manner and by the same mechanism as was the roller 23.

43 designates a roller or shaft reduced at its ends to form bearing portions 44, adapted to enter the bearing-openings in the lower ends of the side suspension-bars 18 and to be removed therefrom when so desired. At the ends of the roller, and also at its center, are located circular disks 45, which are connected in this instance by four longitudinal cutting-blades 46, the edges of which are flush with the cutting-edges of the disks 45. The cutting-disks 45, at points intermediate the blades 46, are provided with radial slots 47, and in said slots are located ejecting-bars 48. These bars 48 have their ends riding in the slots 47 of the outer disks 45 and their central portions bent, as at 49, to ride in these slots of the central disk 45. Between the disks the rods are kinked, as at 50, and take into concavities 51, formed in the roller opposite the kinks. In each concavity is seated a coiled spring 52, which receives or encircles the kinks 50. The tendency of the springs 52 is to throw the arms to the outer ends of the radial slots 47, and yet said springs will permit of the rods being compressed to the inner ends of the slots 47. After the stalk-cutter thus described has been mounted in the suspension-bars 18 and the machine started it will be seen that the cutting-bars and disks 45 and 46 will sever the stalks by impact whether the corn be planted in rows or listed and regardless of the direction in which the machine may travel with relation to the corn. It will be apparent that the above-described stalk-cutter may be kept free from the wedging of portions of the stalk between the longitudinal cutters or the disks by means of the ejecting-rods 48, in that as the cutter revolves the rods will be pressed flat against their springs toward the axial center of the roller, and when released from pressure by the ground the springs 51 will throw them forward suddenly and thus dislodge any trash or stalks wedged between the cutters. The cutter, it will be apparent, may be raised and lowered through the medium of the windlass-shaft and its accessories.

At each side of the shaft 10 is located a transverse bar 53, upon which is supported a table 54, having a central opening 55, upwardly through which extends the periphery of the cam knocking-wheel 11. (See Fig. 3.) Upon the table at each side of the opening 55 I locate a hopper 56, the bottoms of which are formed by the table 54, which table has an opening 57 opposite each hopper for the passage of seed, and over said openings are mounted seed-slides 58, the ends of which extend from out the hoppers upon the table and are pivoted, as at 59, to levers 60, pivoted, as at 61, at each side of the opening 55, and having their inner ends projecting into the path of and adapted to be struck by the cams upon the knocking-wheel 11. The seed-slides are normally maintained over the openings by means of flat springs 62, which rest against the outer ends of the slides and press them inwardly. The table and its hoppers are removably mounted in position, and when so mounted are secured by a spring-latch 63, secured to the draft-beam 6.

Upon the front bar 2 of the frame at its under side and at each side of its center I locate a pair of bearing-ears 64, pivoted in each of which is a curved drill-standard 65, which standards terminate at their lower ends in drill-tubes 66 and are provided with shovels 67. One drill of each pair of standards is arranged in advance of its companion, as shown, and out of alignment therewith. The drills 66 are connected to the seed-openings 57 of the hoppers by means of boots 68, so that seed dropped by the slides are conducted to the drills in the usual manner.

In rear of each of the standards 65 there depends from the rear cross-bar 53 a standard 69, in the lower end of which is fulcrumed, as at 70, a lever 71. The front end of each of the levers is loosely and pivotally connected, as at 72, to a drill-standard 65 in rear of the pivot of the latter. In rear of the fulcrum-point 70 each of the levers 71 is upwardly bent to form pedals 73, which occur directly in front of and under the feet of the driver. By depressing any one of these pedals the drill-standard and drill to which the lever is connected are raised, and thus may pass over stumps, stones, and other obstructions without coming in contact therewith and being broken or injured thereby. Each of the drill-standards rests in a stirrup 74, bolted to and depending from the front cross-bar 53. These stirrups are perforated at their opposite sides and receive removable pins 75, which pass under said standards and therefore limit their depths of penetration.

From the front cross-bar 53, opposite each of the stirrups 74, extend plates 76, each of which has a perforation 77. The rods 78 are loosely connected at their lower ends to each of the standards 65, and the upper ends of the rods pass through and are designed to reciprocate in the perforations 77. Coiled springs 79 encircle the rods and are interposed between the plates and the standards 65, whereby the latter are yieldingly depressed, and stones, roots, and other obstructions in the furrows may be overridden by the shovel-points 67 if they are too deeply and strongly embedded to be removed.

I have heretofore described a hopper designed to co-operate with the drills for the purpose of drilling grain, and I will now proceed to describe a second hopper adapted for planting either broadcast or in drills smaller grains, such as timothy, &c.

To introduce a small grain-hopper I remove the shaft 10, its sprocket or pulley, the belt 25, and chain 14, and locate between the bars 53 the end walls 80 of the hopper 81. (Illustrated in Figs. 4 and 5.) The end walls 80 are connected by opposite inclined side walls 82, forming a main seed-receiving chamber 83, the bottom of which is provided with a longitudinal slot 84 throughout the length thereof. A longitudinal slot 85 is formed in one of the side walls 82, and mounted for reciprocation in the slot is a seed-slide 86, adapted to be adjusted so as to increase or decrease the width of the slot 84. Below the upper hopper 83 is located a seed-chamber 87, the ends of which are provided with bearing-openings for the reception of a rotatable shaft 88, one end of which projects beyond the end wall of the hopper and is there provided with a sprocket 89 for connection with the sprocket-chain 14 or with a belt-pulley 90 for the reception of the endless belt 25. Between the end walls of the hopper the shaft 88 carries a longitudinally-grooved roll 91. The bottom of the agitating-chamber 87 is provided with a longitudinal slot 92, extending throughout the length of the chamber, and the rear wall of said chamber is longitudinally slotted, as at 93, for the reception of a seed-slide 94, designed to increase or diminish the seed-slot 92. The lower ends of the end walls 80 are oppositely recessed, as at 95, so as to fit between the pair of transverse bars 53. The machine being set in motion, it is evident that the seed will be sown broadcast.

If desired to drill the small seed and utilize the hopper 83, said hopper is substituted in the manner before described for the corn-hoppers 56, and a false bottom 95 is bolted to the bottom of the agitating-chamber 87 of the hopper 83. The false bottom 95 is provided with openings 96, which register with the seed-slot 92 of said chamber. To these openings are secured the upper ends of seed-boots 68, the lower ends of the seed-boots taking into the drills. In this manner small seed, as timothy, clover, &c., may be drilled.

97 designates a small harrow-bar, of which there is a series, and said bar, as best shown in Fig. 8, is provided with a series of harrow-teeth 98 and an upwardly-disposed securing arm or plate 99, adapted to be secured by bolts or otherwise to the lower end of a drill 66. By the provision of the small harrows I am enabled to cultivate or harrow between the rows of corn or other plants without liability of injuring the same, as would be the case if I employed a longer harrow-section, hereinafter described, but only adapted for ordinary harrowing.

In Fig. 9 I illustrate an ordinary harrow-frame formed in opposite separate sections 100, said sections being provided with teeth 101 and at their front ends loosely connected by a link 102 and at their rear ends provided with staples 103. The links and the staples have attached thereto stay-chains 104, the upper ends of which are removably connected to the frame-work of the machine. Each of the bars 100 is provided with upwardly-disposed securing-plates 105, which are bolted to the lower ends of the drills 65 in the same manner as the plates 99. (Shown in Fig. 8.)

If desired, I may removably connect to each of the suspension-bars 18 by means of a transverse bar 106 a series of scraping-blades 107, the edges of which take against the plain or concave surfaces of the cutting-disks 41, and thus said disks are kept free from adhering soil, the draft lessened, and the cutting of the disks facilitated.

From the above construction it will be apparent that I include in a single machine a complete planter for planting corn or other large or small cereal either by dropping, drilling, or broadcast, which planting mechanism is adjustable to various kinds of grain; that I provide an adjustable set of drills all similarly actuated and yet capable of independent movement under the control of the driver; that I provide a roller, disk-plow, and stalk-cutter, all of the highest degree of efficiency, capable of a most perfect adjustment, and, furthermore, a successful and efficient harrow for either harrowing between rows or in a general way, as will be apparent.

Having thus described my invention, what I claim is—

1. In an agricultural machine, the combination, with the rectangular frame-work thereof, comprising a pair of transverse bars located a short distance from each other, of a vertically-removable hopper, and means for operating the same, said hopper comprising opposite end walls wider than the distance between the bars and having its opposite edges at its lower ends recessed, as at 95, to fit between said bars, substantially as specified.

2. In an agricultural machine, the combination, with the frame-work, the rearwardly-disposed and pivoted drill-standards, and the cross-bars arranged above the same, of standards depending from one of said cross-bars and a lever fulcrumed in each of said standards, the front ends of the levers being loosely connected to the drill-standards, and the rear ends of the standards upwardly bent to form foot treads or pedals, substantially as specified.

3. In an agricultural machine, the combination, with the frame-work and a pair of suspension-bars 18, loosely pivoted to the rear end of the same and terminating at their lower ends in bearings for the reception of the axle of an attachment of the character described, of a windlass-shaft mounted for rotation upon the frame above the suspension-bar, a ratchet-wheel secured upon the shaft, a pawl 29 for locking the wheel, and a lever 30, loosely mounted upon the shaft and having a pawl for engaging the ratchet, and ropes or chains wound upon the shaft and terminating in hooks adapted to be passed over the rear bar of the frame-work and engage eyes 38 upon the hinged suspension-bars or under said rear bar and engage eyes 39 upon the front faces of said bars, substantially as specified.

4. In an agricultural machine, the combination, with the frame-work and two or more suspension-bars hinged to the rear end of the same and provided with bearings for the reception of a stalk-chopper, roller, or disk harrow, of means for raising said bars above and out of contact with the ground and for drawing the same inwardly to a vertical position under the frame, whereby said frame is raised so that its ground-wheels are out of contact with the ground, substantially as specified.

5. The combination, with the frame-work having the depending bearing-arms 18, of the roll 43, terminating in reduced ends mounted in the bearings of the arms 18, the circular disks 45, mounted on the roll, the longitudinal blades 46, connecting the disks and radiating from the roll, the intermediate longitudinal bars 48, passed through slots formed in the disks, and the coiled springs 51 interposed between the roll and the bars, substantially as specified.

In testimony that I claim the foregoing as my own I have hereto affixed my signature in presence of two witnesses.

CULLEN D. WHITE.

Witnesses:
R. W. DAYTON,
R. J. MARSHALL.